Oct. 12, 1926.  
W. H. BRUNING  
1,603,189  
METHOD OF AND APPARATUS FOR TREATING COFFEE  
Filed July 14, 1925  
3 Sheets-Sheet 2
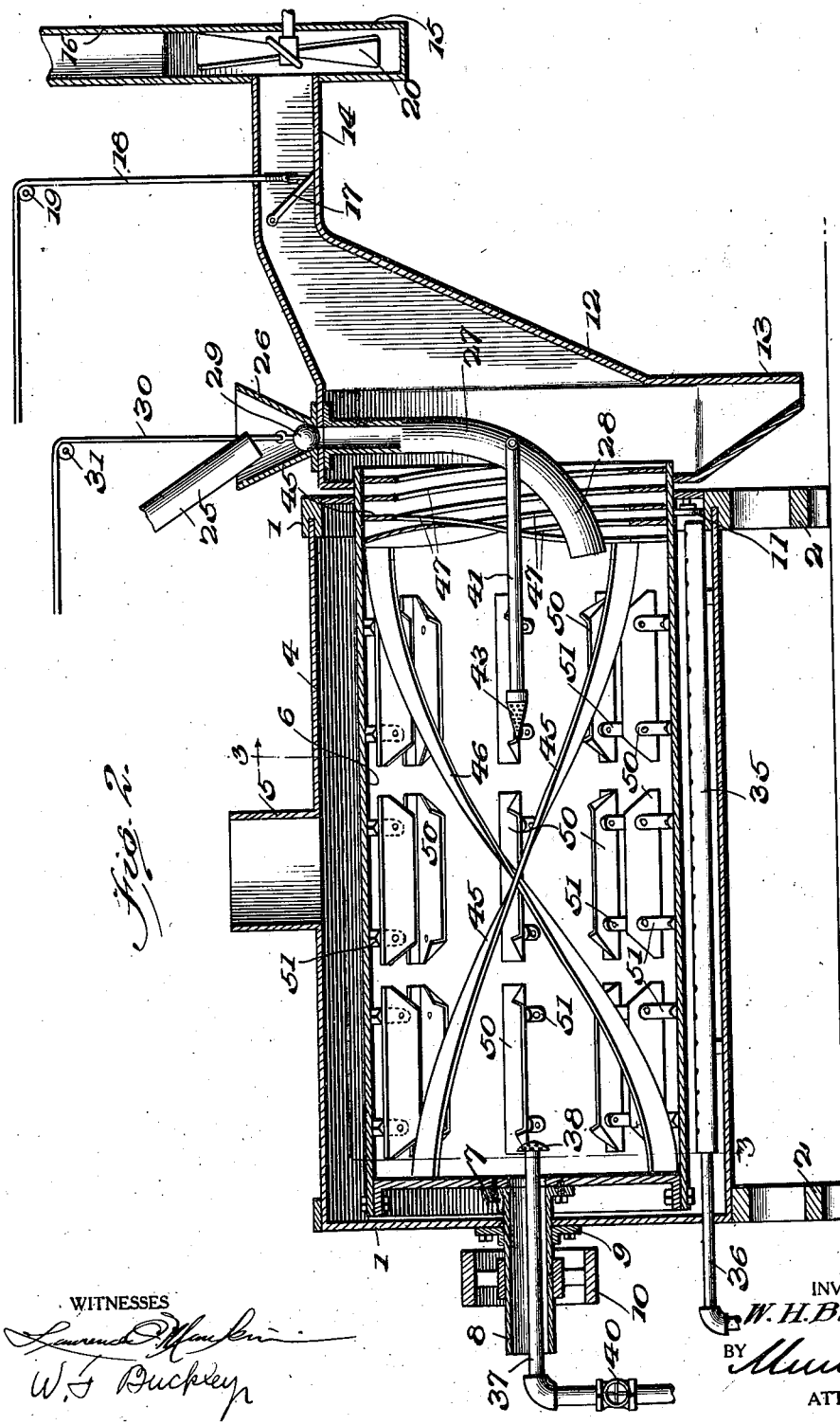

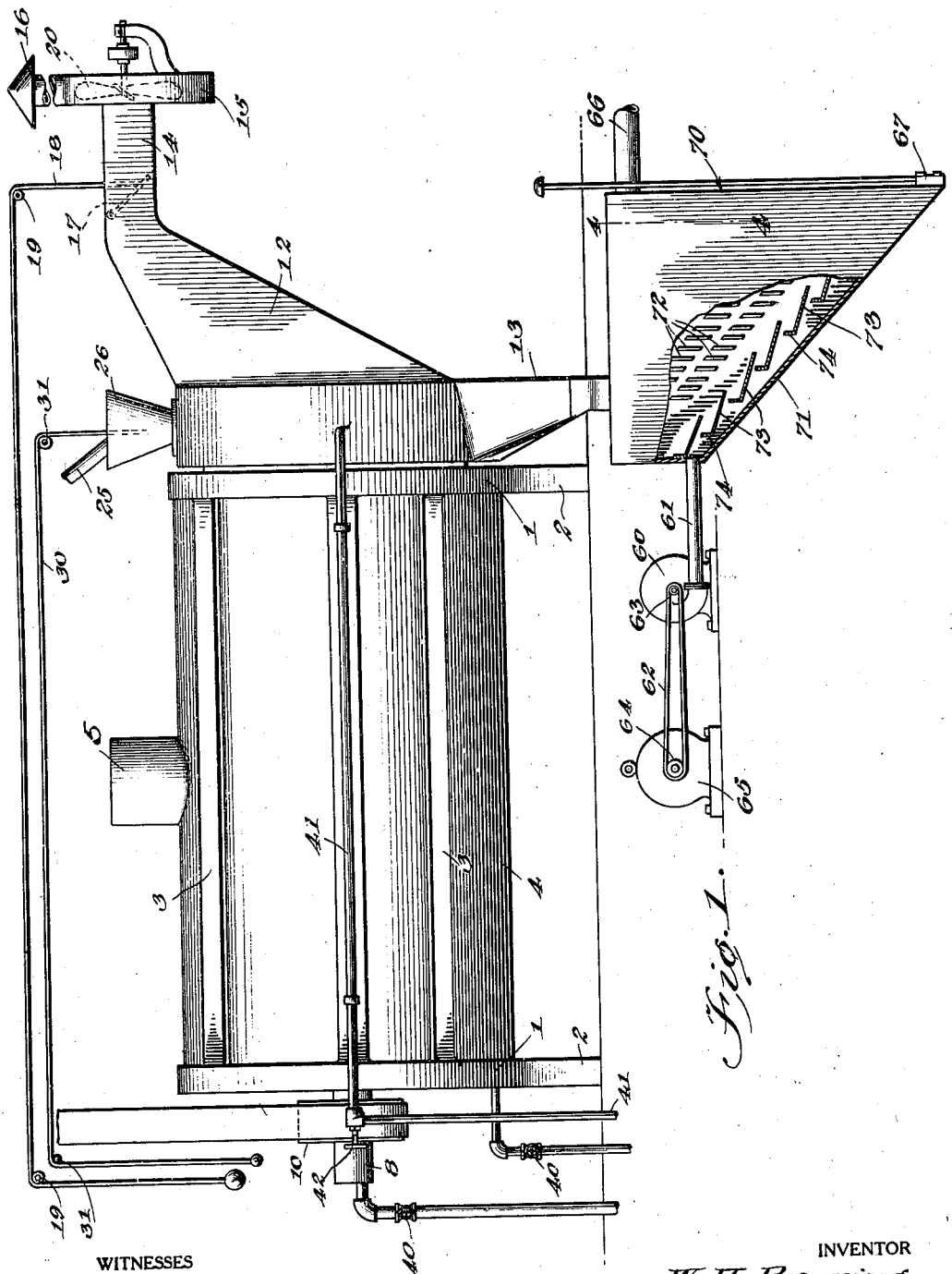

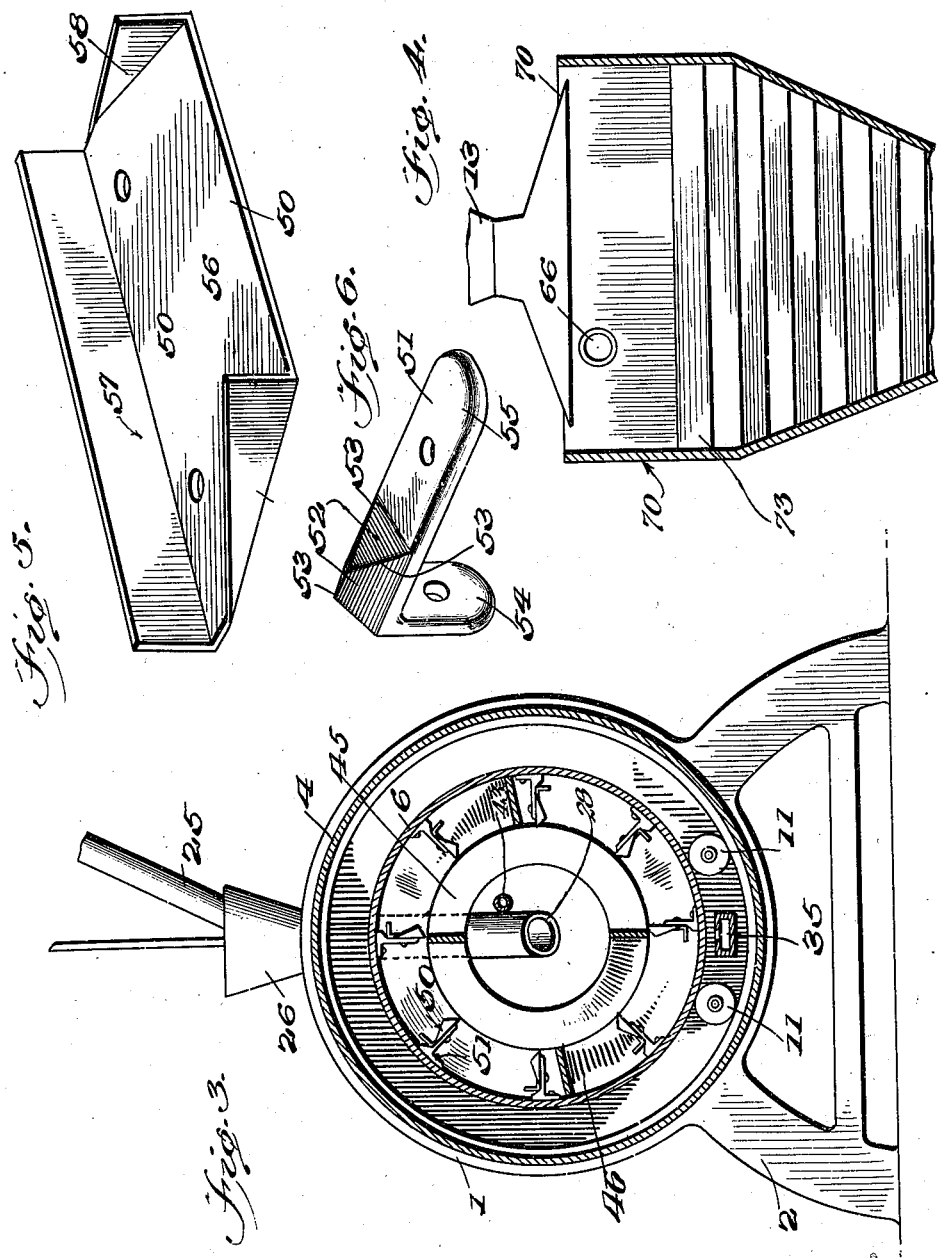

Patented Oct. 12, 1926.

1,603,189

UNITED STATES PATENT OFFICE.

WILLIAM HENRY BRUNING, OF EVANSVILLE, INDIANA.

METHOD OF AND APPARATUS FOR TREATING COFFEE.

Application filed July 14, 1925. Serial No. 43,592.

This invention relates to a method of and apparatus for treating coffee to enhance the flavor of the coffee and render the same of higher quality. More particularly the present invention proposes a method of sweating and roasting the coffee and of moistening and cooling the same as may be required to remove any rawness or harshness from the coffee and mellow and improve the flavor of the same. The invention also proposes the provision of a novel form of apparatus whereby this method may be carried out.

Other objects and advantages reside in certain novel features which will be hereinafter more fully described and particularly pointed out in the appended claims.

In the drawings illustrating the novel form of apparatus for carrying out the method involved in the present invention;

Figure 1 is a view in elevation showing one form of the apparatus, parts being shown in section for the sake of illustration, Figure 2 is a view in central vertical longitudinal section through the coffee roasting and sweating cylinder and associated parts, Figure 3 is a view in transverse vertical section on the line 3—3 of Fig. 2, parts being omitted for the sake of simplicity and illustration, Figure 4 is a view in section on the line 4—4 of Figure 1, Figure 5 is a detail perspective view of one of the coffee lifting plates, and Figure 6 is a similar view of one of the plate supporting lugs.

It is to be understood that the apparatus employed in carrying out the method involved in this invention is a development of the machines shown in my Patents Nos. 310,026 and 310,027, granted December 30, 1884, and reference is made to these patents for a fuller understanding of some of the details of construction of the apparatus.

The apparatus illustrated in Figures 1 to 6 comprises a frame made up of end plates 1 supported on legs 2 connected by longitudinal bars 3. A cylindrical casing 4 is supported by the frame made up of the end plates 1 and bars 3 and as the primary purpose of this casing is to confine the heat and cause the heated gases to properly circulate it is provided with a flue 5 at its central upper portion.

An imperforate roasting and sweating cylinder 6 is mounted within the casing 4. One end of the cylinder 6 is closed by an end plate 7 having a central opening to which a hollow shaft 8 is fixed. The hollow shaft 8 is journaled in a bearing 9 provided therefor on the end plate 1 of the frame and carries a pulley 10 whereby the cylinder may be rotated. The end of the cylinder 6 opposite the end plate 7 is open and is journaled on rollers 11.

A smoke breeching 12 receives the open end of the cylinder 6. The smoke breeching 12 has a discharge spout 13 and also has a vent pipe 14 which leads from the smoke breeching to an exhaust fan casing 15, the exhaust fan casing 15 discharging to an air vent 16. A valve 17 is mounted in the vent pipe and controls the passage of vapor therethrough. The valve is open and closed by suitable control means which may consist of a flexible element 18 trained over suitable guide sheaves 19 to a point of convenient control. A fan 20 is operatively mounted in the fan casing 15 and may be driven from an electric motor or from a line shaft by means of belts and pulleys.

Means is provided for supplying the coffee to be roasted and treated and comprises a supply pipe 25 leading from the source of supply into a hopper 26. The hopper 26 is mounted in the smoke breeching 12 and its lower end registers with an opening formed in the smoke breeching and with a pipe 27 fastened to the smoke breeching on the inside of the opening and having a curved inner end 28 discharging into the cylinder 6. A ball valve 29 controlled by means of a flexible element 30 regulates the amount of coffee fed through the pipe 27 into the cylinder or roasting drum 6. The flexible element 30 is trained over pulleys or guide sheaves 31 and leads to a point of convenient control.

Means is provided for applying heat to the outside of the drum and preferably comprises a gas burner 35 mounted in the casing 4 below the drum 6 and supplied with gas or a mixture of gas and air through the pipe 36. An electric gas lighter may be provided for lighting the gas at the jets of the burners 35. In order to provide for the application of an internal heat or of a flame into the cylinder 6 a gas pipe 37 extends through the hollow axle 8 and is provided at its inner end with a jet 38 designed to project a flame axially through the cylinder 6.

Shut-off valves are incorporated in the gas or fuel supply pipes and are designated at 40.

In the hollow axle 8 a suitable testing or try-out shovel may be inserted in order to ascertain how the treatment is progressing. The shovel when inserted provides a closure for the opening of the hollow axle.

Means is provided for supplying steam or water into the interior of the drum or cylinder 6 and comprises a pipe 41 having a shut-off valve 42 therein, the pipe 41 extending into the smoke breeching or then radially into the open end of the cylinder 6. At its inner end the pipe 41 is provided with a nozzle or jet 43.

The interior of the drum 6 is formed with vanes 45, 46 and 47 of the type disclosed in my prior patents and designed to retain the coffee in the center of the cylinder while the cylinder is being rotated in one direction and to discharge the coffee into the smoke breeching when the cylinder is oppositely rotated. In addition to these vanes plate-like lifters 50 are provided and are fastened in spaced relation to the inner wall of the cylinder by attaching lugs 51. Preferably the lugs 51 are designed to support the plates 50 one-half inch or more from the inner periphery of the cylinder whereby the coffee is permitted to partake of constant and unchecked motion in the rotating cylinder. The portions of the lugs 51 between the lifters 50 and the cylinder having inclined surfaces 52 terminating in ridges 53 to further this same purpose. Each lug 51 has an arm 54 attached to the cylinder and an arm 55 attached to the section 56 of lifter with which it is associated. Each lifter has a section 57 at right angles to the section 56 and is provided with right-angle flanges 58 on its section 56. These lifters continuously cascade the coffee and prevent any of the coffee from lying at the bottom of the cylinder for any appreciable length of time.

After the treatment of the coffee has been completed in the cylinder or drum 6 it is discharged through the spout 13 of the smoke breeching into the aerator and cooler, designated generally at 70, and comprising a casing having an inclined wall 71. A plurality of series of vertical baffles 72 and a series of stepped plates 73 incline slightly from the horizontal and having deflected lips 74. A blower 60 has a discharge pipe 61 leading to the casing 70 and discharging under the plates 73. The fan of the blower is actuated by a belt 62 and pulleys 63 and 64 from a motor 65. The casing 70 has an air outlet 66 and a valve controlled coffee discharge 67. The coffee which is supplied to the aerator and cooler casing 70 drops onto the plate 73 and falls down over the same. During its travel over the plate 58 the air from the blower 60 flows through the coffee to cool the same and carry off chaff and the like, the air flowing around the lips 58 and then out between the baffles 57 to the outlet 66.

In carrying out the method involved in the present invention a batch of coffee is fed into the cylinder 6 through the pipe 28. The batch of coffee thus supplied to the cylinder may be moistened with water through the pipe 41 and nozzle 42 if the coffee is old or dried out. In lieu of sprinkling the dried-out coffee with water it may be subjected to the action of steam jet during the heat treatment to be described, the steam being supplied through the pipe 41 and nozzle 42. At this point it is to be understood that the pipe 41 has separate valved connections with a source of water supply and a source of steam supply. However, it may not be necessary to supply moisture to the coffee, the normal moisture content of the coffee being usually sufficient for the purposes of the present invention. The batch of coffee in the cylinder 6 is housed in a practically closed rotating container and while so housed it is subjected to the action of heat applied externally to the drum or cylinder 6 by means of gas burners 35. While the gas burners 35 are on, the cylinder 6 is continuously rotated and the coffee is continuously cascaded in the drum or cylinder. The effect of this treatment is to sweat or steam the coffee so as to remove any rawness or harshness and mellow and improve the flavor of the coffee. During the sweating of the coffee the valves 17 and 29 are closed and the hollow axle 8 is also closed by the try-out shovel. The length of time to which the coffee is subjected to this sweating or steaming can be regulated by the judgment and experience of the operator but ordinarily with proper external heat thorough sweating can be effected in about ten minutes.

After the sweating has been effected the valve 17 is opened and the fan 20 is rotated to draw air through the hollow axle 8 (the try-out shovel being removed), the rotating cylinder 6, the smoke breeching 12, vent pipe 14, fan casing 20 to the air vent 16. This withdraws the steam from the rotating cylinder and during the subsequent roasting the operation now to be described carries off the liberated chaff and the fumes. The roasting of the coffee which follows the sweating just described is carried out by means of the gas burners 35 which apply heat to the exterior of the roasting cylinder and also by means of the gas jet 38 which projects a flame through the interior of the cylinder. The gas flame thus projected through the cylinder preferably consists of proportionately mixed gas and air which is blown through the cylinder and being ignited in the jet 38 by an electric gas lighter produces an internal flame in the cylinder which travels the entire length of the cylinder. When both external and internal heat are used to effect the roasting of coffee, the coffee can be properly roasted in about ten minutes and will have a superior flavor and aroma. All during the roasting operation the fan 20 is exhausting the chaff and fumes from the cylinder. Whenever it is desired, and it is frequently necessary, to suddenly check the roasting of the coffee, this can be accomplished by treating the coffee in the cylinder with a spray of water from the spray nozzle 43.

After the coffee has been sweated and roasted in the cylinder 6 it is discharged into the aerator and cooler 70 wherein it is not only cooled and aerated but also deprived of all remaining chaff and dust. The coffee as finally prepared may be discharged from the valve controlled outlet 67 into suitable receptacles.

I claim:

1. The herein described method of treating coffee which consists in subjecting the coffee in an enclosed space to the action of heat sufficient to cause the approximate normal moisture content of the coffee to sweat the coffee and subsequently roasting the coffee.

2. The herein described method of treating coffee which consists in subjecting the coffee in an enclosed space to the action of heat sufficient to cause the approximate normal moisture content of the coffee to sweat the coffee in withdrawing the vapor laden air from the enclosed space subsequent to the sweating and in thereafter roasting the coffee.

3. The herein described method of treating coffee which consists in supplying sufficient moisture to the coffee to be treated to restore the moisture content of the coffee to its approximate normal value when the coffee has dried out, subjecting the coffee in an enclosed space to the action of heat sufficient to cause the approximate normal moisture content of the coffee to sweat the coffee, in withdrawing the vapor laden air from the enclosed space subsequent to the sweating and in thereafter roasting the coffee.

4. In a coffee roasting machine, a casing, a cylinder rotatable within the casing and having a hollow axle projecting exteriorly thereof, a gas burner between the casing and the cylinder, and means for supplying heat internally of the cylinder through the hollow axle.

5. In a coffee roasting machine, a casing, a cylinder rotatable in the casing and having an open end projecting from one end of the casing, a smoke breeching for said open end, and means for supplying coffee into the cylinder including a hopper mounted on the smoke breeching, said smoke breeching having an opening registering with the discharge of the hopper and a pipe registering with said opening and having its inner end curved and extending into the open end of the cylinder, the pipe being stationary within the smoke breeching.

6. In a coffee roasting machine, a casing, a rotatable cylinder in the casing having an open end projecting from the casing, a smoke breeching enclosing the open end, means for supplying a batch of coffee to the cylinder through the open end, the smoke breeching having a discharge spout, said cylinder having internal vanes for retaining the coffee therein when the cylinder is rotated in one direction and for discharging the coffee into the smoke breeching when the cylinder is rotated in an opposite direction.

7. In a coffee roasting machine, a casing, a rotatable cylinder in the casing having an open end projecting from the casing, a smoke breeching enclosing the open end, means for supplying a batch of coffee to the cylinder through the open end, the smoke breeching having a discharge spout, said cylinder having internal vanes for retaining the coffee therein when the cylinder is rotated in one direction and for discharging the coffee into the smoke breeching when the cylinder is rotated in an opposite direction, plate-like coffee lifters, and angle brackets supporting the coffee lifters in spaced relation to the inner periphery of the cylinder.

8. In a coffee roasting machine, a casing, a cylinder rotatable in the casing and having one end projecting beyond the casing, and a smoke breeching enclosing the open end of the cylinder, a vent pipe leading from the smoke breeching, an air vent, an exhaust fan between the vent pipe and the air vent, and a valve in said vent pipe.

9. A cooler and aerator for roasted coffee comprising a casing provided with a coffee inlet at its top having an inclined wall, a series of stepped plates along the inclined wall, said plates being inclined downwardly with respect to the horizontal and having upstanding deflectors adjacent the inclined wall, an air outlet in said casing opposite the inclined wall, a series of vertical baffles between the stepped plates and the outlet, means for blowing air across the stepped plates and baffles to the air outlet, and a valve controlled coffee outlet at the lower end of the casing.

WILLIAM HENRY BRUNING.